(12) United States Patent
King et al.

(10) Patent No.: US 9,103,281 B2
(45) Date of Patent: Aug. 11, 2015

(54) GAS TURBINE ENGINE HAVING A ROTATABLE OFF-TAKE PASSAGE IN A COMPRESSOR SECTION

(75) Inventors: Jonathan M King, Melbourne (GB); Crispin D Bolgar, Nottingham (GB); Guy D Snowsill, Belper (GB)

(73) Assignee: ROLLS-ROYCE PLC, London (GB)

( * ) Notice: Subject to any disclaimer, the term of this patent is extended or adjusted under 35 U.S.C. 154(b) by 997 days.

(21) Appl. No.: 13/216,691

(22) Filed: Aug. 24, 2011

(65) Prior Publication Data
US 2012/0060506 A1 Mar. 15, 2012

(30) Foreign Application Priority Data
Sep. 10, 2010 (GB) .................................. 1015029.0

(51) Int. Cl.
*F02C 6/08* (2006.01)
*F01D 9/06* (2006.01)
(Continued)

(52) U.S. Cl.
CPC . *F02C 6/08* (2013.01); *F01D 9/065* (2013.01); *F04D 27/023* (2013.01); *D01H 2700/22* (2013.01); *F01D 5/081* (2013.01); *F02C 9/20* (2013.01)

(58) Field of Classification Search
CPC ............. F02K 1/38; F02K 1/386; F02C 7/18; F02C 6/08; F02C 9/18; F01D 11/24; F01D 17/105; F01D 5/081; F04D 27/0207; F04D 27/0215
USPC ........ 60/262, 782, 785, 795, 806; 415/1, 144, 415/145
See application file for complete search history.

(56) References Cited

U.S. PATENT DOCUMENTS 2,520,697 A * 8/1950 Smith ........................... 415/144
3,287,907 A * 11/1966 Bill ............................... 60/39.5
(Continued)

FOREIGN PATENT DOCUMENTS

EP 1 921 256 A2 5/2008
EP 2 119 892 A2 11/2009
(Continued)

OTHER PUBLICATIONS

Dec. 10, 2010 Search Report issued in British patent Application No. GB1015029.0.
(Continued)

*Primary Examiner* — Phutthiwat Wongwian
*Assistant Examiner* — Michael B Mantyla
(74) *Attorney, Agent, or Firm* — Oliff PLC

(57) ABSTRACT

A gas turbine engine has a compressor section with rotational compressor components rotatable with respect to static compressor components. A compressed air bleed arrangement is provided to cool one or more other rotational components of the gas turbine engine. The compressed air bleed arrangement takes a flow of compressed air from the compressor section along an off-take passage. The off-take passage opens in the compressor section at an off-take port. The off-take passage is rotatable, in use, with the rotational compressor components. The compressed air bleed arrangement is operable to provide the air in the off-take passage with higher static pressure than the air in the compressor section at the off-take port, by diffusing the air in the off-take passage. The off-take passage further includes off-take vanes, operable to increase the tangential velocity of the air in the off-take passage compared with the air at the off-take port.

12 Claims, 5 Drawing Sheets

(51) Int. Cl.
*F04D 27/02* (2006.01)
*F01D 5/08* (2006.01)
*F02C 9/20* (2006.01)

(56) References Cited

U.S. PATENT DOCUMENTS

| | | | | |
|---|---|---|---|---|
| 3,647,313 | A * | 3/1972 | Koff | 415/115 |
| 3,742,706 | A * | 7/1973 | Klompas | 60/726 |
| 3,844,110 | A * | 10/1974 | Widlansky et al. | 60/39.08 |
| 4,155,680 | A * | 5/1979 | Linko et al. | 415/144 |
| 4,807,433 | A * | 2/1989 | Maclin et al. | 60/795 |
| 4,901,520 | A * | 2/1990 | Kozak et al. | 60/782 |
| 5,003,773 | A * | 4/1991 | Beckwith | 60/262 |
| 5,531,565 | A * | 7/1996 | Meindl et al. | 415/144 |
| 5,581,996 | A * | 12/1996 | Koch et al. | 60/782 |
| 5,685,158 | A * | 11/1997 | Lenahan et al. | 60/726 |
| 6,089,010 | A * | 7/2000 | Gross | 60/782 |
| 6,428,271 | B1 * | 8/2002 | Ress et al. | 415/169.1 |
| 6,550,254 | B2 * | 4/2003 | Proctor et al. | 60/785 |
| 6,584,778 | B1 * | 7/2003 | Griffiths et al. | 60/782 |
| 6,672,072 | B1 * | 1/2004 | Giffin, III | 60/782 |
| 7,458,766 | B2 * | 12/2008 | Dailey et al. | 415/1 |
| 7,594,793 | B2 * | 9/2009 | Guemmer | 415/144 |
| 7,624,581 | B2 * | 12/2009 | Moniz | 60/785 |
| 7,926,289 | B2 * | 4/2011 | Lee et al. | 60/782 |
| 7,934,901 | B2 * | 5/2011 | Moniz et al. | 415/115 |
| 8,220,276 | B2 * | 7/2012 | Clemen et al. | 60/785 |
| 8,292,567 | B2 * | 10/2012 | Damle et al. | 415/1 |
| 9,032,738 | B2 * | 5/2015 | Laurello et al. | 60/782 |
| 2008/0041064 | A1 * | 2/2008 | Moore et al. | 60/782 |
| 2008/0141677 | A1 * | 6/2008 | Brillert | 60/785 |
| 2011/0167789 | A1 * | 7/2011 | Dahm | 60/214 |

FOREIGN PATENT DOCUMENTS

| | | |
|---|---|---|
| GB | 1008886 | 11/1965 |
| GB | 2 420 155 A | 5/2006 |
| WO | WO 99/51866 A2 | 10/1999 |

OTHER PUBLICATIONS

Dec. 9, 2013 Search Report issued in European Patent Application No. EP 11 17 8577.

* cited by examiner

GAS TURBINE ENGINE HAVING A ROTATABLE OFF-TAKE PASSAGE IN A COMPRESSOR SECTION

FIELD OF THE INVENTION

The present invention relates to a gas turbine engine and a method of operating a gas turbine engine. It relates particularly, but not exclusively, to arrangements for bleeding compressed air from a compressor section of the gas turbine engine.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

It is known for gas turbine engines to use air bled from a compressor to cool and seal hot parts of the engine, typically in the turbine. The air may be bled from either the outer or inner annulus line of the compressor, at the upstream or downstream face of any stage of rotor blades.

The air is bled from the compressor through off-take ports. Various different off-take port designs are known, such as ramped off-takes and diffusing slots. For example, FIG. 2 shows a typical off-take port 50 formed in the outer annular wall 52 of a compressor stage, located between a stator 54 and rotor 56 of the compressor stage. In this example, the off-take port 50 has a ramped form, intended to reduce the pressure loss across the off-take and thus improve the efficiency of the cooling air system. Another example of a known system is shown in EP-A-1136679. A still further example of a known system is shown in GB-A-1310401.

GB-A-2420155 discloses a gas turbine engine with a multi-stage compressor. A number of equi-angularly spaced off-take ports are formed through the inner annular wall of the compressor, at an axial location between the penultimate and final stages of the compressor. Therefore the off-take ports rotate with the rotor blades of the compressor. The off-take ports lead into off-take passages that are formed perpendicular to the gas path air flow in the compressor. The off-take feeds a downstream cooling system.

SUMMARY OF THE INVENTION

Known off-take ports are designed to deliver air bled from the compressor at the highest possible static pressure. For example, in the case of ideal (isentropic) off-take, the static pressure down stream of the off-take would be equal to the absolute total pressure up stream of the off-take and there would be no change in the absolute total temperature. This ideal off-take would provide the coolest possible air from a compressor at a required pressure for non-rotating engine components.

However, it necessary in many types of gas turbine to cool rotating components such as turbine blades, turbine discs, etc. Furthermore, it is considered by the inventors that known gas turbine engines could be cooled more efficiently by making more efficient use of the dynamic head of the flowing air. Accordingly, the present invention aims to address the problem of providing more efficient cooling of components in a gas turbine.

Accordingly, in a first preferred aspect, the present invention provides a gas turbine engine having a compressor section with rotational compressor components rotatable with respect to static compressor components, wherein a compressed air bleed arrangement is provided to cool one or more other components of the gas turbine engine, the compressed air bleed arrangement taking a flow of compressed air from the compressor section along an off-take passage, the off-take passage opening in the compressor section at an off-take port, wherein the off-take passage is rotatable, in use, with the rotational compressor components, the compressed air bleed arrangement being operable to provide the air in the off-take passage with higher static pressure than the air in the compressor section at the off-take port.

In a second preferred aspect, the present invention provides a method of operating a gas turbine engine, the gas turbine engine having a compressor section, the method including the steps of operating the gas turbine engine to rotate rotational compressor components with respect to static compressor components, and cooling one or more other components of the gas turbine engine with a compressed air bleed arrangement, the compressed air bleed arrangement taking a flow of compressed air from the compressor section along an off-take passage which opens in the compressor section at an off-take port, wherein the off-take passage rotates with the rotational compressor components, and wherein the air in the off-take passage is provided with higher static pressure than the air in the compressor section at the off-take port.

The first and/or second aspect of the invention may have any one or, to the extent that they are compatible, any combination of the following optional features.

The present invention is based on the realisation that the temperature of the air "felt" by the components to be cooled (relative total temperature) should be minimised if possible.

Providing the air in the off-take passage with higher static pressure allows the pressure of the air to be substantially matched to the requirements of the component to be cooled, e.g. without requiring further upstream or downstream compression.

In this disclosure, the total pressure is defined as the sum of the static pressure and the dynamic pressure of the flowing air. The dynamic pressure is defined as $(0.5*\text{density}*(\text{velocity})^2)$.

Reference is made in this disclosure to "angular velocity", with respect to flowing air and with respect to moving components of the engine. The engine typically has a principal rotational axis, the compressor section and the turbine section typically being co-axial with the principal rotational axis. The airflow typically has an axial velocity component, which is excluded when considering the angular velocity. As will be understood, a rotating mechanical component of the engine (e.g. compressor blade) has the same angular velocity at all points on the rotating component. However, a rotating body of air can be considered in the following manner. Assuming that the mass flow of air is large and hence friction is small, the flow can be considered to behave as a free vortex. As a rotating body of air in the engine is brought closer to the rotational axis, conservation of angular momentum means that the angular velocity of the air will increase, in accordance with the equations:

Angular momentum=$I\omega$ $I=mr^2$ where I is the moment of inertia, $\omega$ is the angular velocity, m is mass and r is the radius of rotation. Therefore if r is reduced, $\omega$ must increase.

Reference is also made in this disclosure to "tangential velocity", with respect to flowing air and with respect to moving components of the engine. The rotation of components of the compressor section, for example, can be considered in terms of their instantaneous linear velocity in a direction perpendicular to, but radially offset from (at radial distance r), the principal rotational axis. This is the tangential velocity. A rotating mechanical component of the engine (e.g. compressor blade) has a tangential velocity that varies with radial distance r from the principal rotational axis. Next consideration is given to the tangential velocity of flowing air in the engine. The axial velocity component of the airflow is excluded when considering the tangential velocity. Since the tangential velocity is related to $\omega$ as $\omega r$, the tangential velocity of a rotating body of air increases (typically inversely proportionally to radius) as the radius decreases, to maintain conservation of angular momentum. Note that if the mass flow of air is relatively small, then friction cannot be ignored. In this case, the tangential velocity of the air will move towards the disc velocity. In other words, for a small mass flow of air, the tangential velocity of the air may increase or decrease depending on the starting swirl ratio which is discussed below.

Reference is also made in this disclosure to "swirl" and "swirl ratio". Swirl can be considered as the non-axial flow of air through the engine. This is typically caused by rotation of engine components. The swirl ratio at a location in the engine is defined as the ratio between the tangential velocity of the air and the tangential velocity of the engine component at that location. It is possible, for example, for the swirl ratio to be 1, where the air tangential velocity is the same as the engine component tangential velocity. It is also possible for the swirl ratio to be less than 1, e.g. 0.5, where the air tangential velocity is less than the engine component tangential velocity. Furthermore, it is possible for the swirl ratio to be more than one, particularly as the swirling air comes inboard.

Preferably, the air in the off-take passage is provided with higher tangential velocity than the air in the compressor section at the off-take port. Typically, the direction of the off-take passage is towards, rather than away from or parallel to the principal rotational axis of the engine. It is particularly preferred that the air in the off-take passage is provided with a further increase in tangential velocity than would otherwise be provided due to conservation of angular momentum as the air moves towards the principal rotational axis of the engine.

It is preferred that the cooling air bled from the compressor should be delivered to a rotating component of the gas turbine engine, e.g. a rotating turbine component in a turbine section of the gas turbine engine. In this case, it is preferred that the cooling air should be delivered to the rotating component with a tangential velocity that is substantially matched to the tangential velocity of the component to be cooled.

Typically, the compressor section has an inner annular periphery and an outer annular periphery. In this case it is preferred that the off-take port opens into the compressor section via the inner annular periphery. The compressor section of a typical gas turbine engine operates so that the inner peripheral components rotate with respect to static outer peripheral components. Therefore locating the off-take port at the inner annular periphery conveniently ensures that the off-take passage rotates with the rotatable compressor components.

Preferably the off-take port is located upstream of a stator in the compressor section. More preferably, the off-take port is located upstream of a stator of a final stage of the compressor section. Preferably, the off-take port is located downstream of a rotor in the compressor section. Thus, it is preferred that the off-take port is located downstream of a rotor and upstream of an adjacent stator in the compressor section. This allows the bleed air to have a high tangential velocity.

In alternative embodiments, it is possible for the off-take port to be located downstream of a stator.

The off-take port may extend circumferentially around at least a part of the compressor section. For example, the off-take port may be a circumferentially-extending slot. In this case, the off-take passage may similarly extend circumferentially. Alternatively, a series of off-take ports may be provided, spaced circumferentially around the compressor section. These off-take ports may be regularly spaced from each other. In this case, there is preferably only one off-take passage associated with each off-take port.

Preferably, the off-take passage is a stepped off-take passage. This allows good recovery of the dynamic head.

Preferably, the off-take passage provides an air flow path direction at an acute angle to an air flow path direction in the compressor section. Here, "acute" angle is used in the sense of an angle which is less than 90°, more preferably significantly less than 90°, e.g. less than 80°, less than 70°, less than 60°, or less than 45°. This allows the bleed arrangement to capture at least a part of the dynamic head of the airflow. As will be understood, the minimum angle will be subject to competing considerations in terms of overall engine design.

Preferably, the off-take passage includes one or more vanes shaped to increase the tangential velocity of the air in the off-take passage in comparison to the air at the off-take port. This increase in tangential velocity is a further increase in tangential velocity, over and above any natural increase in tangential velocity that occurs due to decreasing the radius of the swirling air and conserving angular momentum. Preferably the off-take passage vanes extend substantially radially in the engine.

The swirl ratio of air at the off-take port is typically less than 1. Preferably, the swirl ratio of the air at the exit of the off-take passage is higher than the swirl ratio of air at the off-take port. For example, the swirl ratio of air in the off-take passage may be increase from about 0.5 to about 1.

Preferably, the or each off-take passage includes an upstream opening and a downstream opening, the upstream opening coinciding with the off-take port.

The or each off-take passage may be shaped in order to reduce the axial velocity of the air in the off-take passage (or at the exit of the off-take passage) compared with the air at the off-take port. Preferably, in order to achieve this, the off-take passage takes the form of a diffuser. The diffuser preferably provides the off-take passage with a progressively (and preferably gradually) increasing cross-sectional area when considered in a direction from upstream to downstream in the off-take passage. In this way, the axial velocity component of the air can be gradually reduced in the off-take passage. This has the effect of advantageously increasing the static pressure of the bleed air.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS, AND FURTHER OPTIONAL FEATURES OF THE INVENTION

Gas turbines typically use air bled from a compressor section to cool and seal hot parts of the engine, typically in the turbine. In the preferred embodiments of the present invention, air is bled from the inner annulus line of the compressor via an off-take port, at the upstream or downstream face of any stage of rotor blades.

Figure 1:
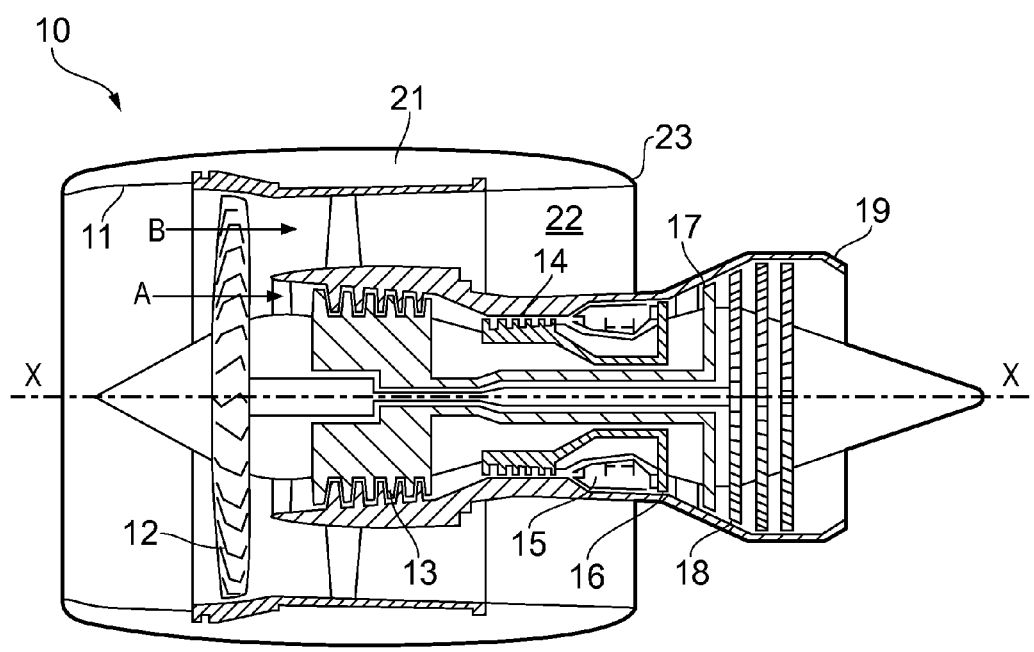
FIG. 1 shows a schematic sectional view of a typical ducted fan gas turbine engine.
Figure 2:
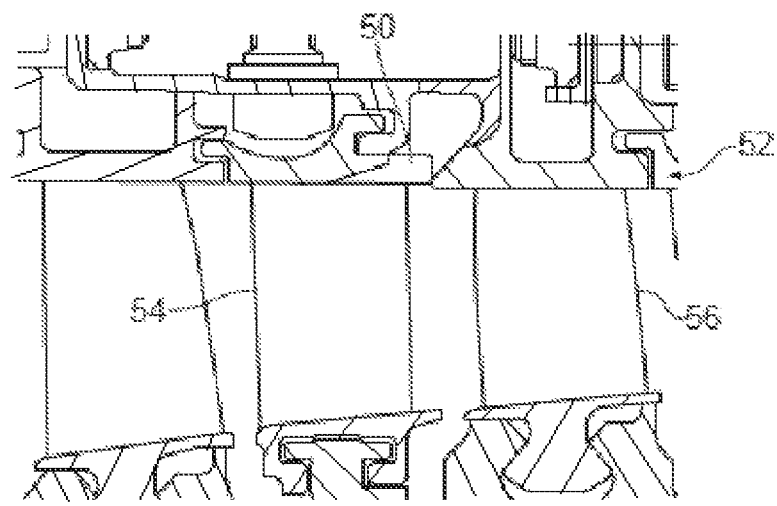
FIG. 2 shows a schematic sectional view of part of a compressor section of a typical gas turbine engine.
Figure 3:
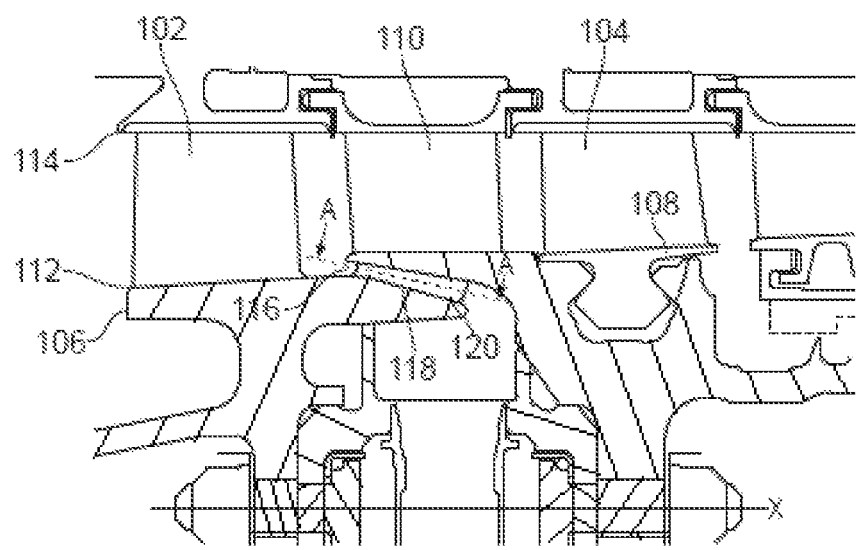
FIG. 3 shows a schematic sectional view of part of a compressor section of a gas turbine engine according to an embodiment of the invention.

FIG. 3 shows a schematic sectional view of part of a compressor section of a gas turbine engine according to an embodiment of the invention. Compressor rotor blades 102, 104 rotate about principal rotational axis X, and are supported by rotor supports 106, 108, respectively. Located downstream of rotor blade 102 but upstream of rotor blade 104 is stator 110. The compressor section is defined by an inner, rotatable annulus 112 and a an outer, non-rotating annulus 114, represented in FIG. 3 by dotted lines.

Located through the inner rotatable annulus 112 is a bleed air off-take port 116. Off-take port 116 is a stepped off-take, in the sense that it defines a step in the inner rotatable annulus 112. Off-take port 116 leads to off-take passage 118 which extends at an acute angle to the axial flow direction through the compressor section. Off-take passage 118 includes an array of off-take vanes 120, only one of which is shown in the view of FIG. 3. The off-take passage extends circumferentially around the compressor section.

As shown in FIG. 3, the off-take passage 118 gradually increases in height, and thus in cross-sectional area, with distance from the off-take port 116. The effect of this is to gradually reduce the axial velocity of the air bled through the off-take passage, converting at least a part of the dynamic head into static pressure.

Figure 4:
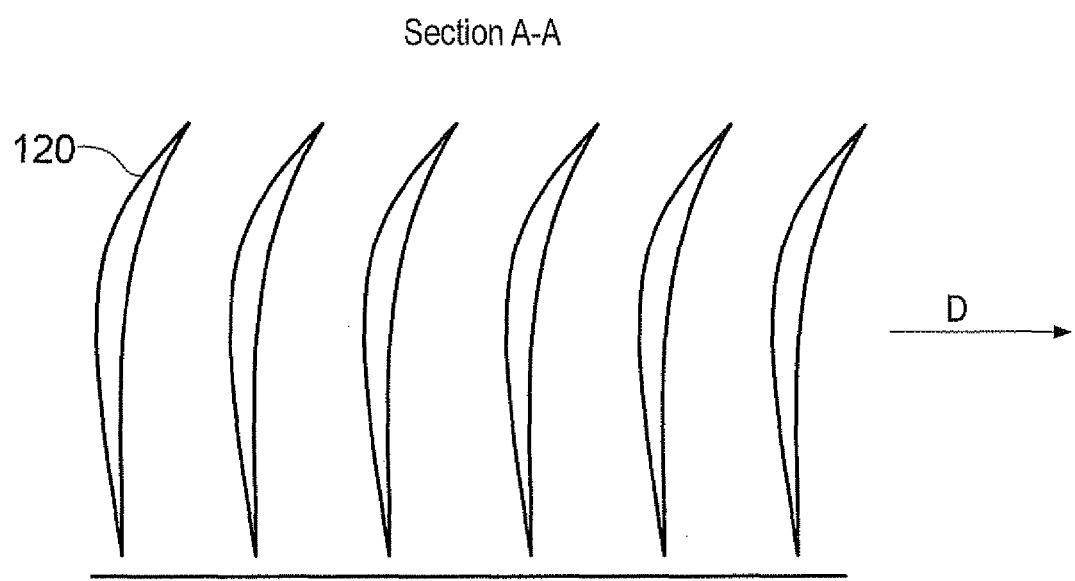
FIG. 4 shows a sectional view along section A-A in FIG. 3.

FIG. 4 shows a sectional view along section A-A in FIG. 3. An array of off-take vanes 120 is shown. Since the off-take passage rotates with the inner annulus 112 of the compressor, so the off-take vanes rotate in direction D.

Figure 5:
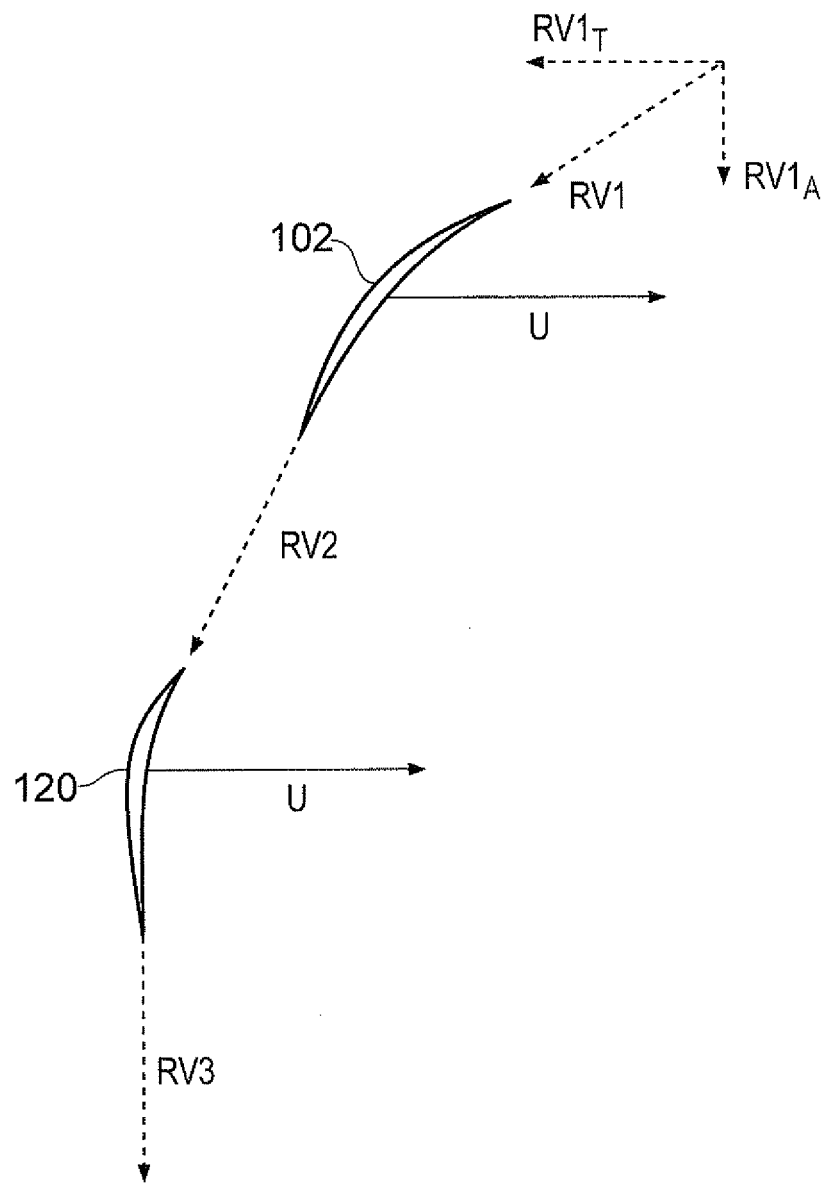
FIG. 5 shows a diagram illustrating the effect of blades in the off-take in FIGS. 3 and 4 on the tangential velocity of the air.

FIG. 5 shows the effect of the rotor blades in the compressor section and the off-take vanes in the off-take passage on the tangential velocity of the air. Compressor rotor blade 102 and off-take passage vane 120 rotate at the same angular speed U in the direction shown by the solid arrows in FIG. 5.

The dashed arrows show the velocity of air relative to the rotors. The relative velocity of air entering the gas path of compressor rotor blade 102 is RV1. RV1 can be notionally considered as the sum of a relative axial velocity component $RV1_A$ and a relative tangential velocity component $RV1_T$.

The relative velocity of air exiting the compressor rotor blade and entering the rotor blade 120 in the off-take passage is RV2. As can be seen, the relative tangential component of RV2 is less than the relative tangential component of RV1. (Note that the relative tangential and axial components of RV2 are not illustrated on the drawing, for the sake of clarity.)

The relative velocity of air exiting the rotor blade 120 in the off-take passage is RV3. As can be seen, the relative tangential component of RV3 is less than the relative tangential component of RV2 and RV1. (Note that the relative tangential and axial components of RV3 are not illustrated on the drawing, for the sake of clarity.)

Thus, the air exiting the off-take passage has a lower tangential velocity than the air in the compressor section when measured in the rotating frame of reference. Put another way, the air exiting the off-take passage has a higher tangential velocity than the air in the compressor section when measured in the static frame of reference. Thus, this air can be used for cooling rotating turbine components in the turbine section of the engine without the need to further increase the tangential velocity of the air.

FIG. 5 illustrates the situation where the swirl ratio of the air entering the off-take port is less than 1. Using the off-take vanes in the off-take passage, the tangential velocity of the air is increased until the swirl ratio is equal to about 1. Since this is done in the rotating frame the relative total temperature of the air is unchanged.

Accordingly, using the preferred embodiment of the invention, it is possible to extract air from a compressor in the rotating frame and increase the static pressure of the air by diffusing the axial velocity component. Furthermore, it is possible to increase the tangential velocity of the air by suitable use of off-take passage vanes. In this way, there is provided an efficient means of extracting air from a compressor without destroying its tangential velocity. This enables the bleed air to be delivered to rotating components at a lower relative total temperature, but at the required pressure, and hence provides a more efficient means of cooling rotating components. In turn, this leads to overall reduced engine fuel consumption.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A gas turbine engine comprising:
    a compressor section with rotational compressor components rotatable with respect to static compressor components;
    a compressed air bleed arrangement that cools one or more other components of the gas turbine engine and that takes a flow of compressed air from the compressor section along an off-take passage, wherein the off-take passage opens in the compressor section in a stepped arrangement at an off-take port and comprises a radially outer surface that is rotatable, in use, with the rotational compressor components, wherein the off-take passage includes one or more vanes shaped to increase a tangential velocity of a flow of compressed air in the off-take passage in comparison to a flow of compressed air at the off-take port, and wherein the compressed air bleed arrangement is operable to provide the flow of compressed air along the off-take passage with higher static pressure than the flow of compressed air at the off-take port, and wherein the one or more other components of the gas turbine engine includes at least one rotating component of a turbine section of the gas turbine engine and the compressed air bleed arrangement delivers the flow of compressed air from the compressor section to the at least one rotating component with a tangential velocity that is substantially matched to a tangential velocity of the at least one rotating component.

2. A gas turbine engine according to claim 1 wherein the compressor section has an inner annular periphery and an outer annular periphery, the off-take port opens into the compressor section via the inner annular periphery.

3. A gas turbine engine according to claim 1 wherein the off-take passage provides an air flow path direction at an acute angle to an air flow path direction in the compressor section.

4. A gas turbine engine according to claim 1 wherein the off-take passage is shaped as a diffuser in order to reduce an axial velocity of the flow of compressed air in the off-take passage compared with the flow of compressed air at the off-take port.

5. A gas turbine engine according to claim 1 wherein the flow of compressed air in the off-take passage is provided with higher tangential velocity than the flow of compressed air at the off-take port.

6. A gas turbine engine according to claim 5 wherein the direction of the off-take passage is towards the principal rotational axis of the engine, the off-take passage being operable to further increase the tangential velocity of the flow of compressed air in the off-take passage that would otherwise be provided due to conservation of angular momentum as the flow of compressed air in the off-take passage moves towards the principal rotational axis of the engine.

7. A gas turbine engine according to claim 1 wherein the off-take port is located upstream of a stator in the compressor section.

8. A gas turbine engine according to claim 1 wherein the off-take port is located upstream of a stator of a final stage of the compressor section and downstream of an adjacent rotor of the compressor section.

9. A method of operating a gas turbine engine, the gas turbine engine comprising a compressor section, the method comprising the steps of:

operating the gas turbine engine to rotate rotational compressor components with respect to static compressor components;

cooling one or more other components of the gas turbine engine with a compressed air bleed arrangement, the compressed air bleed arrangement taking a flow of compressed air from the compressor section along an off-take passage which opens in the compressor section in a stepped arrangement at an off-take port, the off-take passage comprising a radially outer surface that rotates with the rotational compressor components, wherein the off-take passage includes one or more vanes shaped to increase a tangential velocity of a flow of compressed air in the off-take passage in comparison to a flow of compressed air at the off-take port, and the flow of compressed air in the off-take passage is provided with higher static pressure than the flow of compressed air at the off-take port, wherein the one or more other components of the gas turbine engine includes at least one rotating component of a turbine section of the gas turbine engine and the flow of compressed air from the compressor section is delivered to the at least one rotating component with a tangential velocity that is substantially matched to a tangential velocity of the at least one rotating component.

10. A method according to claim 9 wherein the off-take passage is shaped as a diffuser and reduces an axial velocity of the flow of compressed air in the off-take passage compared with the flow of compressed air at the off-take port.

11. A method according to claim 9 wherein the direction of the off-take passage is towards the principal rotational axis of the engine, the off-take passage increasing the tangential velocity of the flow of compressed air in the off-take passage further than would be provided due only to conservation of angular momentum as the flow of compressed air in the off-take passage moves towards the principal rotational axis of the engine.

12. A method according to claim 9 wherein a swirl ratio of a flow of compressed air at an exit of the off-take passage is higher than a swirl ratio of the flow of compressed air at the off-take port.

* * * * *